(12) United States Patent
Yan et al.

(10) Patent No.: US 9,551,590 B2
(45) Date of Patent: Jan. 24, 2017

(54) GESTURE-BASED INFORMATION AND COMMAND ENTRY FOR MOTOR VEHICLE

(75) Inventors: Baoshi Yan, Mountain View, CA (US); Fuliang Weng, Mountain View, CA (US); Liu Ren, Sunnyvale, IN (US); You-Chi Cheng, Palo Alto, CA (US); Zhongnan Shen, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 2202 days.

(21) Appl. No.: 12/550,128

(22) Filed: Aug. 28, 2009

(65) Prior Publication Data

US 2011/0050589 A1    Mar. 3, 2011

(51) Int. Cl.
| | |
|---|---|
| G06F 3/041 | (2006.01) |
| G06F 3/033 | (2013.01) |
| G10L 15/00 | (2013.01) |
| G01C 21/36 | (2006.01) |
| B60K 37/06 | (2006.01) |
| G06F 3/0488 | (2013.01) |

(52) U.S. Cl.
CPC .......... *G01C 21/3664* (2013.01); *B60K 37/06* (2013.01); *G06F 3/04883* (2013.01); *B60K 2350/1004* (2013.01); *B60K 2350/1012* (2013.01); *B60K 2350/1024* (2013.01); *B60K 2350/1036* (2013.01); *B60K 2350/1044* (2013.01); *B60K 2350/1048* (2013.01); *B60K 2350/2013* (2013.01)

(58) Field of Classification Search
None
See application file for complete search history.

(56) References Cited

U.S. PATENT DOCUMENTS

| | | | |
|---|---|---|---|
| 6,434,450 B1* | 8/2002 | Griffin et al. .................... 701/1 |
| 7,050,606 B2 | 5/2006 | Paul et al. | |
| 7,158,871 B1 | 1/2007 | Ilan et al. | |
| | (Continued) | | |

FOREIGN PATENT DOCUMENTS

| | | |
|---|---|---|
| CN | 1302409 A | 7/2001 |
| DE | 103 04 720 A1 | 8/2004 |
| | (Continued) | |

OTHER PUBLICATIONS

English Translation of Chinese First Office Action and Search Report corresponding to Chinese Patent Application No. 201080042969.5, dated May 30, 2014 (15 pages).

(Continued)

*Primary Examiner* — Wayne Young
*Assistant Examiner* — Mark Fischer
(74) *Attorney, Agent, or Firm* — Maginot, Moore & Beck LLP

(57) ABSTRACT

A method of receiving input from a user includes providing a surface within reach of a hand of the user. A plurality of locations on the surface that are touched by the user are sensed. An alphanumeric character having a shape most similar to the plurality of touched locations on the surface is determined. The user is audibly or visually informed of the alphanumeric character and/or a word in which the alphanumeric character is included. Feedback is received from the user regarding whether the alphanumeric character and/or word is an alphanumeric character and/or word that the user intended to be determined in the determining step.

15 Claims, 4 Drawing Sheets

(56) References Cited

U.S. PATENT DOCUMENTS

| | | | |
|---|---|---|---|
| 7,295,904 B2 | 11/2007 | Kanevsky et al. | |
| 2002/0126876 A1* | 9/2002 | Paul et al. | 382/104 |
| 2005/0168449 A1* | 8/2005 | Katayose | 345/173 |
| 2006/0047386 A1* | 3/2006 | Kanevsky et al. | 701/36 |
| 2006/0085115 A1* | 4/2006 | Ilan et al. | 701/49 |
| 2006/0086896 A1* | 4/2006 | Han | 250/221 |
| 2006/0103632 A1* | 5/2006 | Bourdelais et al. | 345/173 |
| 2006/0136846 A1 | 6/2006 | Im et al. | |
| 2007/0185631 A1 | 8/2007 | Yeh et al. | |

FOREIGN PATENT DOCUMENTS

| | | | |
|---|---|---|---|
| EP | 1475693 A2 | 11/2004 | |
| WO | 9957648 A1 | 11/1999 | |
| WO | 2009040322 A1 | 4/2009 | |

OTHER PUBLICATIONS

English Translation of Chinese Second Office Action corresponding to Chinese Patent Application No. 201080042969.5, dated Nov. 5, 2014 (14 pages).

English Translation of Chinese Third Office Action corresponding to Chinese Patent Application No. 201080042969.5, dated Jan. 30, 2015 (4 pages).

\* cited by examiner

GESTURE-BASED INFORMATION AND COMMAND ENTRY FOR MOTOR VEHICLE

BACKGROUND OF THE INVENTION

1. Field of the Invention

The present invention relates to systems and methods for electronically receiving inputs, commands and information from a human, and, more particularly, to systems and methods for electronically receiving inputs, commands and information from a driver of a vehicle.

2. Description of the Related Art

Information entry in a motor vehicle by the vehicle operator, such as address entry to navigation devices, has always been a challenging and often dangerous task. Traditionally, vehicle operators issue commands or enter information by operating various controls in the car, such as physical buttons for radios, or displayed buttons on the touch screen of a navigation system. Such operations typically require that the operator divert his eyes from the road in order to locate the desired buttons, and sometimes the operator overstretches his arms in trying to reach the desired buttons. This is especially distracting, time-consuming, and dangerous when the buttons are small, such as on a touch screen, and the task is complicated, such as when entering an address into a navigation device. Moreover, a touch screen has to be installed within close proximity to (i.e., within the reach of) the driver, thus limiting the design options for in-vehicle dashboard layout.

Instead of using touch screens, several auto manufacturers use a combination of remote control and graphical display (for example, BMW iDrive system, and Lexus Remote Touch Interface system), so that the graphical display could be placed farther away from the operator. Still, these systems require that the operator operates the remote controls, and looks at the visual feedback on the graphical display for information and command entry. Address entry on the iDrive system, for example, requires that the operator operates the remote control to select from a list of letters, states, and/or city names from the graphical display. This is still a lengthy and dangerous process as the operator needs to move his eyes off the road for a significant period of time.

What is neither disclosed nor suggested in the art is a driver input system that overcomes the problems and limitations described above. More particularly, what is neither disclosed nor suggested is a driver input system that enables the user to provide inputs via spatial hand gestures such as by "drawing" alphanumeric characters with his finger on a surface within the vehicle.

SUMMARY OF THE INVENTION

The present invention may provide a novel system for information and command entry by a user in a motor vehicle using hand gestures. The system may include a surface in the motor vehicle, a gesture-capturing module, a gesture recognition module, an optional gesture confirmation module, and a communication module. By use of the system, a motor vehicle operator may "write" on a surface in the vehicle (such as on a generally flat surface in the middle of the steering wheel) using hand gestures. The hand gestures may be captured by a gesture-capturing module, such as a camera. The information and commands denoted by the gestures may be recognized, confirmed, and then transmitted to other devices in the car. Such information and commands may be commands for operating devices such as radios or heaters, or may be content such as destination addresses for navigation devices. The system of gesture recognition may be integrated with a speech recognition system, or systems of other input modalities, so that information and commands may be better recognized using input from multiple modalities.

The invention comprises, in one form thereof, a method of receiving input from a user, including providing a surface within reach of a hand of the user. A plurality of locations on the surface that are touched by the user are sensed. An alphanumeric character having a shape most similar to the plurality of touched locations on the surface is determined. The user is informed, possibly audibly, of the alphanumeric character and/or a word in which the alphanumeric character is included. The user may confirm whether the alphanumeric character and/or word is an alphanumeric character and/or word that the user intended to be determined in the determining step. This user feedback may be audible, written, or tactile, such as the pressing of a confirmation button, for example.

The invention comprises, in another form thereof, a method of entering input into a vehicle system. A surface is provided on a steering wheel and/or an armrest of the vehicle. A plurality of locations on the surface that are touched by the user are sensed. An alphanumeric character best matching the plurality of touched locations on the surface is determined. An input is transmitted to an electronic system of the vehicle. The input is dependent upon the determined alphanumeric character.

The invention comprises, in yet another form thereof, an arrangement for providing electronic inputs to a system within a vehicle. A surface is disposed within a passenger compartment of the vehicle. A gesture-capturing module is associated with the surface. The gesture-capturing module identifies a plurality of locations on the surface that are touched by a user. A gesture recognition module is communicatively coupled to the gesture-capturing module. The gesture-recognition module determines an alphanumeric character having a shape most similar to the plurality of touched locations on the surface. A gesture confirmation module is communicatively coupled to the gesture recognition module. The gesture confirmation module interacts with the user to thereby confirm that the determined alphanumeric character or a word including the determined alphanumeric character is an alphanumeric character or word that the user intended to convey via the user touching the screen. The gesture confirmation module transmits an input to the system within the vehicle. The input is dependent upon the confirmed alphanumeric character or word.

An advantage of the present invention is that it is safer and easier to learn than known pushbuttons, touch screens, or remote control systems. The invention is safer because it seldom results in a user diverting his eyes from the road. The invention may call for the user's visual attention only in the limited cases when a visual confirmation mechanism is used. This is possible because, instead of selecting from a list displayed on a visual display, a user may input his information or commands via writing with his hand gestures. The system of the invention is also easy to learn as the user expresses his intentions via writing, whereas in other systems the user might need to learn the function of different remote controls.

Another advantage is that the invention does not require that touch-pads be installed on the steering wheel, thus freeing the space for other usages, and avoiding the potential safety concerns caused by the activation of airbags under the steering wheel.

Yet another advantage is that, in addition to the steering wheel, any surface within the operator's proximity, such as the armrest, could be used by the user to write upon.

Still another advantage is that the invention has the potential of higher recognition accuracy as the use of a surface may help locate the gesture and reduce the variations in hand movement. Further, the background of the surface could be leveraged.

A further advantage is that, in addition to commands, the invention may enable entry of information such as addresses, contact names, or phone numbers.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
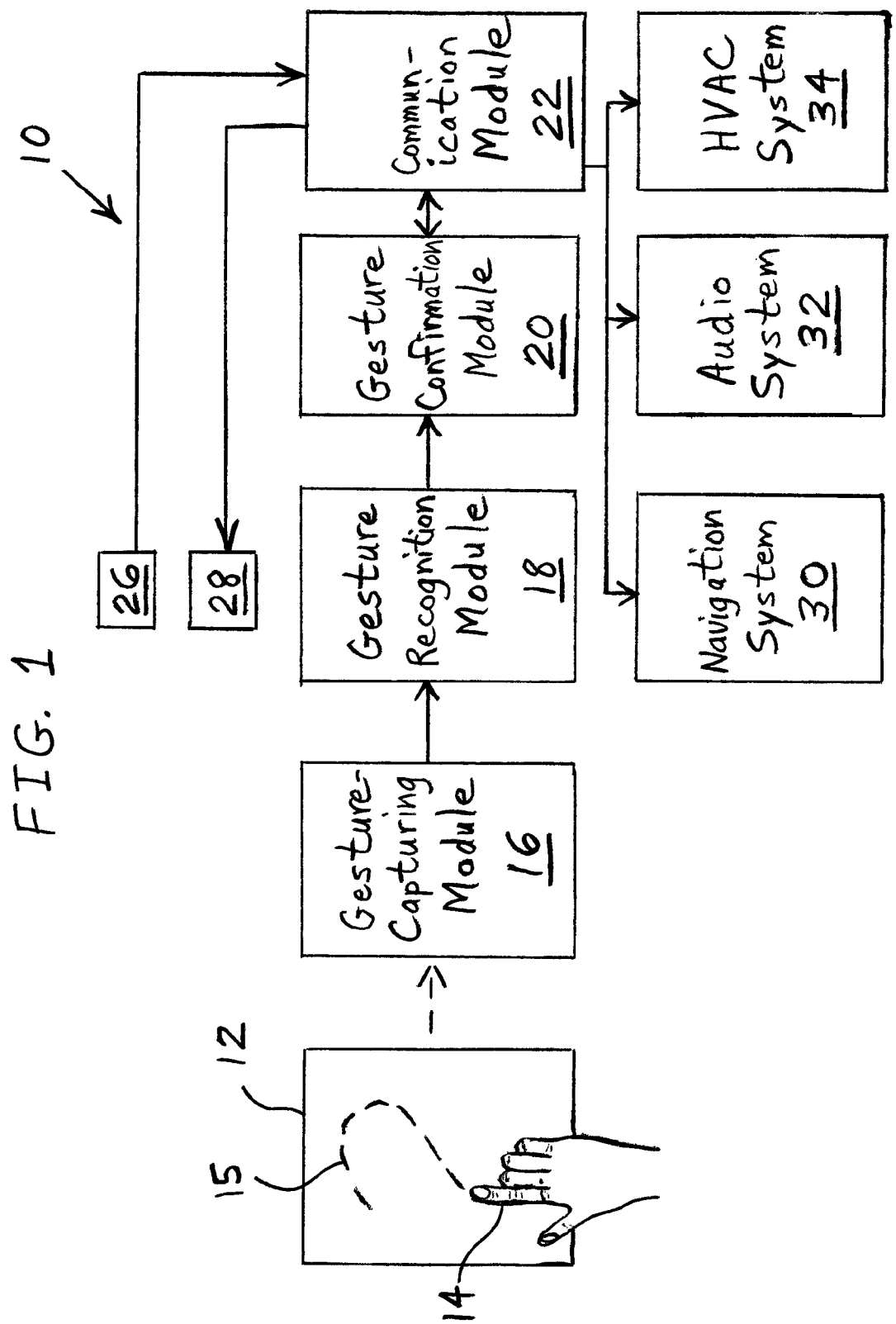
FIG. 1 is a block diagram of one embodiment of a gesture-based information and command entry system of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

The present invention may provide a method and system that enables a motor vehicle operator to enter information and commands without diverting his eyes from the road or overstretching his arms. Using the system, the operator "writes", via hand gestures, on a surface anywhere within a pre-designated area close to the operator in the motor vehicle, such as the surface of the steering wheel or arm rest. Any surface within the operator's proximity may be used to write upon. Gestures may be in the form of the operator sliding his finger across the surface to make writing movements. Thus, the invention may avoid the need for the operator to locate and operate pushbuttons. The information and commands denoted by the hand gestures may be captured by a gesture capturing module, recognized by a recognition module, confirmed via a confirmation module, and then transmitted to corresponding devices within the vehicle.

In one embodiment of the system, one or more cameras are mounted inside a motor vehicle to capture the image of the steering wheel, as well as the operator's hand gestures when he "writes" on the steering wheel. In a particular embodiment, the operator writes down the destination address for the navigation device on the steering wheel using his index finger, just as he would on a piece of paper. The hand gestures, i.e., the movements of the user's hand and fingers, may be captured by the mounted camera(s). A recognition module may recognize the address denoted by the hand gestures. The recognized address may then be transmitted to the navigation device.

Other embodiments of the invention may integrate the gesture input modality with other user input modalities such as speech input in a dialog system. In one embodiment, the user may speak the destination address while writing all or part of the address on the steering wheel using hand gestures. Both speech input and hand gesture input may be integrated to help the recognition module recognize the intended address.

The in-vehicle information and command entry system of the invention has a novel setup: the use of a surface anywhere within the operator's proximity, and integration with a dialog system with acoustic confirmation. The invention provides a novel paradigm shift and yet also provides a natural input approach: the operator writes down information instead of using a set of predefined gesture patterns.

The invention may be applicable to any in-vehicle human-machine interface (HMI) system. For example, the operator input system of the invention may be used to enter inputs into a navigation system, an entertainment system, or an HVAC (heating, ventilation, and air conditioning) climate control system.

Referring now to the drawings, and particularly to FIG. 1, there is shown one embodiment of a gesture-based information and command entry system 10 of the present invention, including a surface 12 on which a user may "air-write" by sliding his index finger 14 across surface 12. Finger 14 may maintain contact with surface 12 throughout the writing process.

The user may write alphanumeric characters on surface 12. In the example of FIG. 1, the user is writing the number "2" on surface 12. For illustrative purposes, the beginning of the number "2" is depicted in a dashed line 15 on surface 12. However, in actuality, there may be no visible indication on surface 12 of where finger 14 has previously been.

The movements of finger 14 along surface 12 may be sensed and recorded by gesture-capturing module 16. In one embodiment, gesture-capturing module 16 may be in the form of one or more cameras. For example, module 16 may detect and record in digital form the movement of finger 14 along a path, such as the path depicted by line 15.

The finger movements sensed by module 16 are digitized, and these digitized movements are transmitted as an input to a gesture recognition module 18. Gesture recognition module 18 may determine which of the twenty-six letters or ten numerals is best represented by the movement made by the user's finger or hand. Module 18 may recognize lower- or upper-case letters, and also may recognize printed letters, block letters, or script letters.

The recognition function performed by module 18 may depend upon the shape of surface 12. For example, if surface 12 is convex, as may be typical for the central portion of a steering wheel, then module 18 may take the convexity into account when determining which alphanumeric character has been drawn. Further, module 18 may take into account the exact shape of surface 12, including the position of each point of surface 12 along a direction generally perpendicular to surface 12.

Gesture recognition module 18 may recognize a single character, or may recognize groups of letters and/or numbers in the form of words. Module 18 may discern a recognizable word when enough characters have been drawn to do so, or after the user has indicated that the last character of a word has been drawn. The user may indicate that the last character of a word has been drawn by, for example, drawing a period (i.e., dot) on surface 12 or by interrupting his drawing activity on surface 12 for a predetermined period of time.

The output of gesture recognition module 18 may be in the form of a word, letter or number that corresponds to a possible selection, command, input, or piece of information provided by the user. For example, the output of gesture recognition module 18 may be in the form of the letter "B", or the numeral "3" corresponding to particular respective menu selections. The output of gesture recognition module 18 may also be in the form of a command such as "find" for a navigation system, "play" for an entertainment system, or "defrost" for an HVAC system, for example. Associated with such commands may be input data that the user also writes on surface 12, before or after the command. For example, associated with the command "find" may be the address "10 Elm Street". As another example, associated with the command "play" may be "Beethoven 5$^{th}$ Symphony", or a radio station identification such as "WGN" or "720 AM". As yet another example, associated with a "heat" command for an HVAC system may be a temperature level such as "75 F" and/or a location such as "driver".

Figure 2:
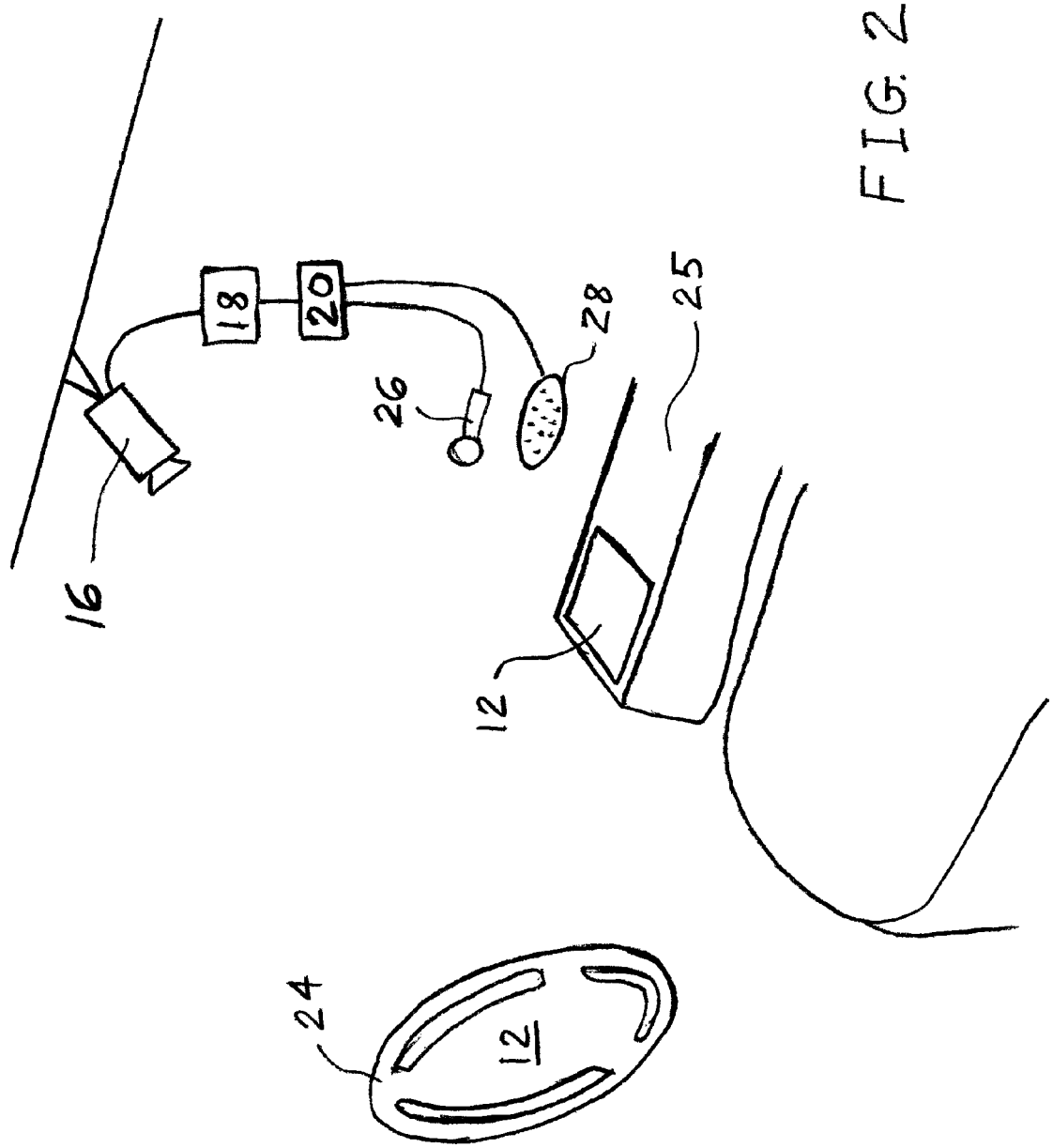
FIG. 2 is a perspective view of the gesture-based information and command entry system of FIG. 1.

The output of gesture recognition module 18 may be received by an optional gesture confirmation module 20. Gesture confirmation module 20 may seek and/or receive feedback from the user to confirm that the output of gesture recognition module 18 is correct. For example, confirmation module 20 may audibly seek confirmation from the user of his input. If the output of gesture recognition module 18 is "defrost", then confirmation module 20 may audibly (e.g., via audio speaker 28; FIG. 2) ask the driver "Did you write 'defrost?'". In order to confirm that he did indeed say "defrost", the user may speak "yes", which may be received by a microphone 26 and input into confirmation module 20. Alternatively, the user may confirm that he did indeed say "defrost" by writing "y" for "yes" on surface 12. If, on the other hand, the user did not write "defrost", then he may speak "no" or write "n" on surface 12. In response, confirmation module 20 may audibly ask the driver to "please re-write the previous entry". The cycle continues with gesturing capturing module 16 interpreting the user's gestures until confirmation module 20 receives confirmation that it recognized the gesture correctly (i.e., as the user intended). After receiving confirmation of correct recognition of the user's gesture, confirmation module 20 may then forward the recognized gesture to a vehicle system, such as navigation system 30, audio system 32 or HVAC system 34. In addition, or in the alternative, confirmation module 20 may use other modalities (visual, pushbutton, gesture, etc.) for seeking user confirmation as well.

It is to be understood that gesture confirmation module 20 is optional in the invention. That is, it is possible for the recognition output of module 18 to be forwarded to vehicle systems 30, 32 and/or 34, perhaps by communication module 22, without the recognition or interpretation being first confirmed by confirmation module 20.

A perspective view of gesture-based information and command entry system 10 as installed within the passenger compartment of an automobile is shown in FIG. 2. Two surfaces 12 for the driver to finger-write upon are shown, although only one of the two surfaces 12 may be included in practice. One of surfaces 12 is provided in the central portion of a steering wheel 24. Another one of surfaces 12 is provided on the top of the driver's right-hand side armrest 25.

A gesture-capturing module in the form of a camera 16 may be installed on the roof of the car's passenger compartment, generally above the driver's head. Camera 16 may be directed towards whichever of the two surfaces 12 is actually provided in the vehicle. However, it is also possible, in an embodiment which includes both of surfaces 12, for camera 16 to be adjustable such that it may be selectively directed at either or both of surfaces 12.

As shown in FIG. 2, confirmation module 20 may be connected to a microphone 26 and an audio speaker 28. Microphone 26 and audio speaker 28 may be installed anywhere within the passenger compartment, such as in the armrest, in the dashboard, or in the doors, for example.

Figure 3:
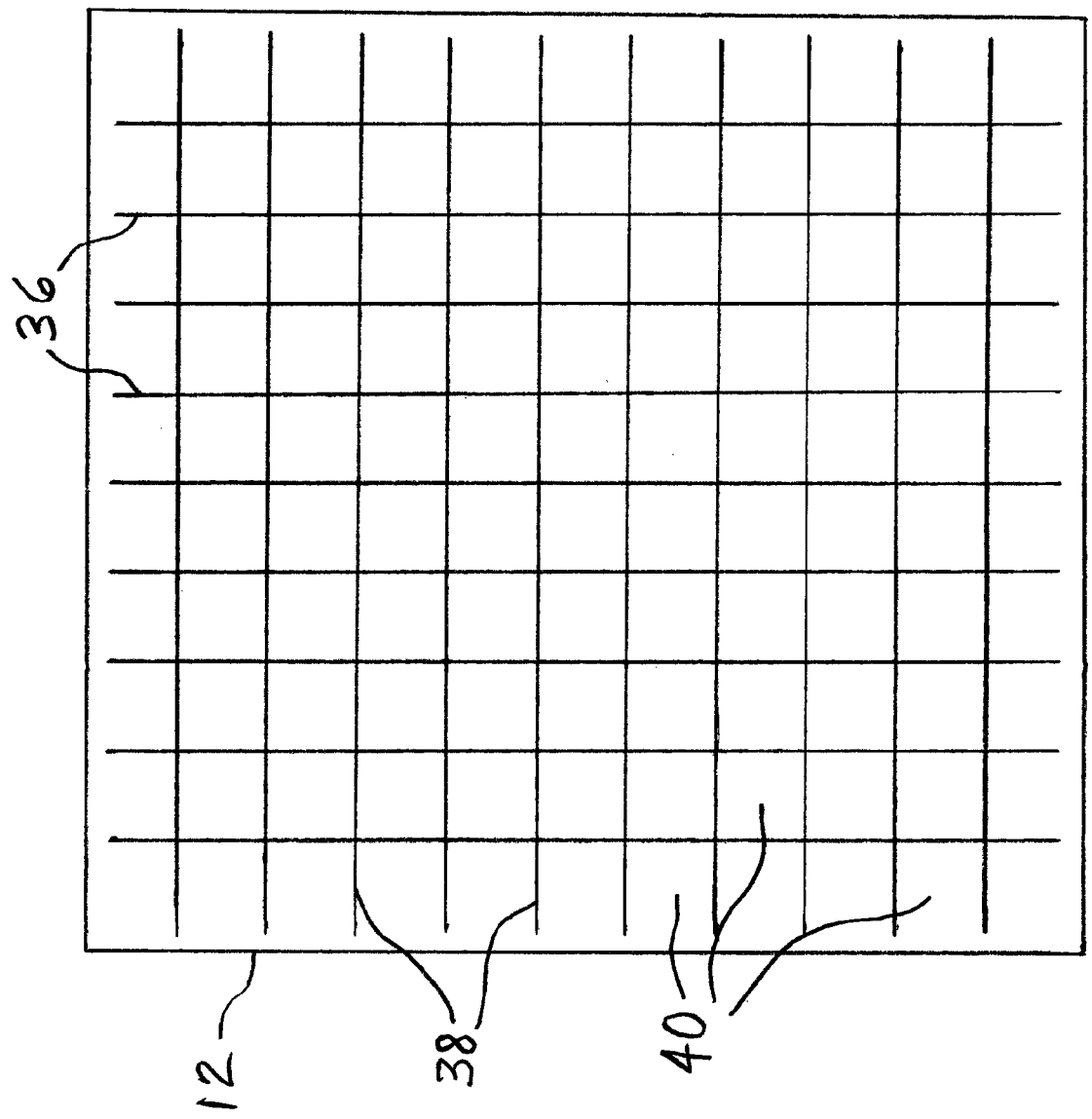
FIG. 3 is a plan view of one embodiment of the writing surface of FIGS. 1 and 2.

FIG. 3 illustrates a grid layout that may be included in one embodiment of a writing surface 12. The grid layout includes a rectangular matrix of rows and columns as defined by equally-spaced vertical lines 36 and equally-spaced horizontal lines 38.

Gesture recognition module 18 may determine which alphanumeric character the user has drawn based upon which cells 40 within the grid layout the user has slid his finger across, and in what sequential order he did so. Gesture recognition module 18 may use a lookup table or an algorithm to make a list of cells 40 that the user's finger has passed across, and translate that list of cells into a recognized alphanumeric character. The sequential order in which cells 40 were touched may also be an input into the lookup table or algorithm.

In order to improve the visual contrast between the user's hand and background surface 12, and thus improve the accuracy of the gesture-capturing process, surface 12 may be formed of a solid color such as white. Such a solid white color for surface 12 may also make it easier for camera 16 to detect the locations of lines 36, 38 by virtue of the greater contrast provided thereby.

Figure 4:
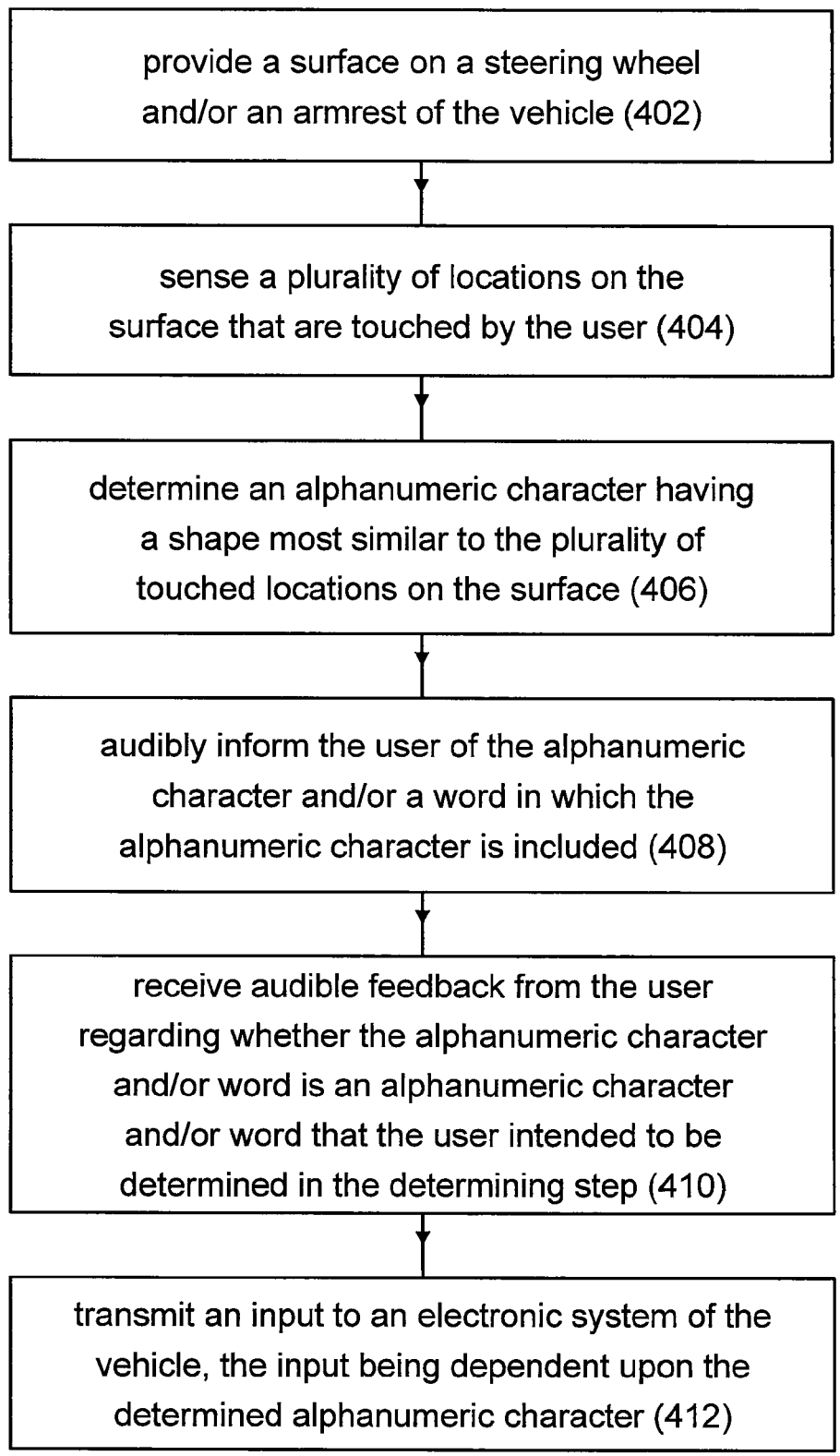
FIG. 4 is a flow chart of one embodiment of a method of the present invention for receiving input from a user.

In FIG. 4, there is shown one embodiment of a method 400 of the present invention for entering input into a vehicle system. In a first step 402, a surface is provided on a steering wheel and/or an armrest of the vehicle. That is, a surface 12, as shown in FIG. 2, may be provided on a steering wheel 24 or on an armrest 25.

In a next step 404, a plurality of locations on the surface that are touched by the user are sensed. For example, a camera 16 may capture the movements of a driver's finger along surface 12 and identify the locations on the surface that are touched. Camera 16 may sense which of cells 40 (FIG. 3) on surface 12 are touched. Alternatively, camera 16 may sense only the movements of the finger (e.g., in the air) without relation to the location of surface 12.

Next, in step 406, an alphanumeric character having a shape most similar to the plurality of touched locations on the surface may be determined. For example, a lookup table or an algorithm may be employed to which numeral or letter is best represented by the group of locations defined by the movement of the user's finger.

In step 408, the user is audibly informed of the alphanumeric character and/or a word in which the alphanumeric character is included. For example, a synthesized voice may be played through speaker 28 saying a letter or numeral, such as "a" or "1", that the system has determined to be most similar to the shape defined by the movement of the user's finger. Alternatively, the synthesized voice may not state individual letters or numerals, but instead may be inhibited until the system has determined a word formed by a sequential series of the characters determined from the finger movement. For example, after the user has written the letters "f", "i", "n" and "d" with his finger, the synthesized voice may say the word "find" via speaker 28. In addition, the system may add a phrase prompting the user to confirm the system's interpretation of his finger writing. In one embodiment, before stating the determined word, the system audibly says "did you write", and then says the determined word (e.g., "find"). In another embodiment, the system states a phrase, or group of words that may be acted upon by the system. For example, the system may vocalize an actionable command, such as "find gas station" that is intended for a navigation system.

The system may determine a word or phrase that best fits its recognition of the individual alphanumeric characters, while assuming that not every one of the individual characters has been correctly recognized. For example, if the system recognizes the sequential series of letters as being "f", "j", "n" and "d", the system may determine from its dictionary that the "j" was most likely intended to be an "i", and hence the system may interpret the word as "find".

In a next step 410, audible feedback is received from the user regarding whether the alphanumeric character and/or word is an alphanumeric character and/or word that the user intended to be determined in the determining step. For example, the user may speak his confirmation or lack of confirmation of the system's interpretation of his finger writing, and this oral statement may be picked up by microphone 26. In one embodiment, the user may say "correct" or "incorrect". In another embodiment, the user may, in addition or alternatively, state a corrected interpretation. For example, in response to the system stating "R", the user may state, "No, P". The system may assume from its first interpretation that the user intend to write a letter that is at least similar to the letter "R", and thus this knowledge may assist the system in interpreting the user's audible vocalization as the letter "P" instead of similar sounding letters such as "C" or "G".

In another embodiment, the user may, in addition to or in place of his vocal correction (e.g., "No, P"), may re-write his previous misinterpreted writing. For example, the user may re-write "P" on the surface, taking care to avoid any movements that could be interpreted as being part of an "R".

In the case of the system misinterpreting only part of a phrase, the user may orally restate the phrase correctly and may re-write on surface 12 only the corrected part of the phase. For example, if the system audibly asks "Did you write 'Find R Street'?", the user may say "No, find P Street", and the user may also (e.g., substantially simultaneously), re-write only the corrected portion (i.e., the letter "P") on surface 12.

In another embodiment, the system may ask for audible confirmation only if its degree of confidence in its interpretation of the writing on surface 12 is below a threshold level. That is, if the writing matches an alphanumeric character or word closely enough, then the system may not ask for confirmation. In yet another embodiment, the level of demand that the driving task is currently placing on the driver's attention is a factor in whether to ask for audible confirmation. For example, if the vehicle is traveling at high speed or has being making frequent turns, then the system may be temporarily less likely to distract the driver by asking for audible confirmation. The system may further be more likely to ask for confirmation about safety-critical functions (e.g. defroster operation) or navigation functions than it is to ask about entertainment or audio functions, which may be less important to the driver. In yet another embodiment, the likelihood of the system asking for audible confirmation may be inversely related to the sound or noise level in the passenger compartment, as measured via microphone 26.

In a final step 412, an input is transmitted to an electronic system of the vehicle, wherein the input is dependent upon the determined alphanumeric character. For example, the input "find pizza" may be transmitted to a navigation system of the vehicle, wherein this input is in response to the system's recognition of each of the nine letters in this two-word phrase.

In another embodiment, the system may sense that the user is attempting to write in lower-case letters, which may be more difficult for the system to recognize. In response, the system may interpret future writings with an assumption that the user was using lower-case letters in those writings as well. Alternatively, or in addition, the system may audibly ask the driver to "Please write in capital (upper-case) letters", so that they system may interpret the writings with greater accuracy.

In yet another embodiment, the system may compensate for movements of the vehicle in its interpretations of the writings. For example, if surface 12 is on steering wheel 24, then gesture recognition module 18 may compensate for the rotation of steering wheel 24, which may tend to drag the user's finger along with the rotation, when recognizing the written alphanumeric character. As another example, a sudden lane change may cause the user's finger to make a horizontal zigzag pattern on surface 12, and gesture recognition module 18 may ignore the zigzag when matching the finger movements to an alphanumeric character. Similar, more subtle effects may be caused by acceleration, deceleration and/or turning, and the interpretation of the finger writing may be compensated for all these effects. Conventional on-vehicle sensors, such as speedometers, steering sensors, gyroscopes, etc., may provide the vehicle movement data to gesture recognition module 18.

Although the invention has been described herein as being applied to a vehicle, it is to be understood that the invention may have other applications. More generally, the invention may be applicable to any system in which an operator may need to quickly enter alphanumeric input without diverting his attention from another task. For example, the invention may be utilized in a factory environment and used by a human machine operator.

While this invention has been described as having an exemplary design, the present invention may be further modified within the spirit and scope of this disclosure. This application is therefore intended to cover any variations, uses, or adaptations of the invention using its general principles.

What is claimed is:

1. A method of receiving input into a vehicle from a user, said method comprising the steps of:
   providing a surface within reach of a hand of the user;
   sensing a plurality of locations on the surface that are touched by the user;
   determining an alphanumeric character having a shape most similar to the plurality of touched locations on the surface;

transmitting an input to an electronic system of the vehicle, the input being dependent upon the determined alphanumeric character;

informing the user of the alphanumeric character and/or a word in which the alphanumeric character is included; and receiving feedback from the user regarding whether the alphanumeric character and/or word is an alphanumeric character and/or word that the user intended to be determined in the determining step, wherein the sensing and determining steps are repeated until a word formed by the alphanumeric characters is identified, the informing step comprising audibly or visually informing the user of the identified word.

2. The method of claim 1 wherein the surface includes a grid of cells, the sensing step including ascertaining which cells of the surface are touched by the user, the determining step comprising using a lookup table or algorithm relating the ascertained touched cells to the determined alphanumeric character.

3. The method of claim 1 comprising the further step, in response to receiving feedback from the user that the alphanumeric character or word is correct, of transmitting a second input to an electronic system, the second input being dependent upon the alphanumeric character or word.

4. The method of claim 1 wherein the informing step includes asking the user for confirmation that the alphanumeric character and/or word is an alphanumeric character and/or word that the user intended to be determined in the determining step.

5. The method of claim 4 wherein the user is a driver of the vehicle and has a driving task, and a level of demand that the driving task is placing on the user is a factor in whether the user is asked for the confirmation.

6. The method of claim 4 wherein the user is a driver of a motor vehicle, and the user is more likely to be asked for the confirmation if the confirmation is related to a safety-critical function of the motor vehicle than if the confirmation is related to an entertainment function of the motor vehicle.

7. The method of claim 4 wherein the user is in a passenger compartment of a motor vehicle, and a likelihood that the user is asked for the confirmation is inversely related to a sound level and/or a noise level in the passenger compartment.

8. The method of claim 4 wherein the user is a driver of a motor vehicle, the determining step including compensating, when recognizing the alphanumeric character, for a finger of the user dragging along with rotation of a steering wheel of the motor vehicle.

9. The method of claim 4 wherein the user is a driver of a motor vehicle, the determining step including compensating, when recognizing the alphanumeric character, for movement of a finger of the user caused by a lane change of the motor vehicle.

10. The method of claim 4 wherein the user is a driver of a motor vehicle, the determining step including compensating, when recognizing the alphanumeric character, for movement of a finger of the user caused by acceleration and/or deceleration of the motor vehicle.

11. A method of entering input into a vehicle system, said method comprising the steps of:

providing a surface on a steering wheel and/or an armrest of the vehicle;

sensing a plurality of locations on the surface that are touched by a user;

determining an alphanumeric character best matching the plurality of touched locations on the surface;

transmitting an input to an electronic system of the vehicle, the input being dependent upon the determined alphanumeric character; and confirming via feedback from the user that the determined alphanumeric character is an alphanumeric character that the user intended to convey when touching the surface, wherein the sensing and determining steps are repeated until a word formed by the determined alphanumeric characters is identified, the input being dependent upon the identified word, the word being a command or information to the electronic system.

12. The method of claim 11 wherein the confirming step includes:

informing the user of the determined alphanumeric character;

receiving feedback from the user related to whether the determined alphanumeric character is the user's intended alphanumeric character;

detecting vocalizations from the user; and ascertaining a string of alphanumeric characters best matching the vocalizations from the user as well as the plurality of touched locations on the surface, the input to the electronic system being dependent upon the ascertained string of alphanumeric characters.

13. An arrangement for providing electronic inputs to a system within a vehicle, comprising:

a surface disposed within a passenger compartment of the vehicle;

a gesture-capturing module associated with the surface, the gesture-capturing module being configured to identify a plurality of locations on the surface that are touched by a user;

a gesture recognition module communicatively coupled to the gesture-capturing module, the gesture-recognition module being configured to determine an alphanumeric character having a shape most similar to a shape formed by the plurality of touched locations on the surface; and a gesture confirmation module communicatively coupled to the gesture recognition module, the gesture confirmation module being configured to:

interact with the user to thereby confirm that the determined alphanumeric character or a word including the determined alphanumeric character is an alphanumeric character or word that the user intended to convey via the user touching the screen; and transmit an input to the system within the vehicle, the input being dependent upon the confirmed alphanumeric character or word, wherein the gesture-capturing module comprises a camera.

14. The arrangement of claim 13 wherein the gesture confirmation module is configured to:

inform the user of the determined alphanumeric character; and receive feedback from the user related to whether the determined alphanumeric character is the alphanumeric character that the user had in mind.

15. The arrangement of claim 13 wherein the surface is covered with a grid of cells, and the gesture-capturing module is configured to identify which cells are touched by the user.

* * * * *